UNITED STATES PATENT OFFICE.

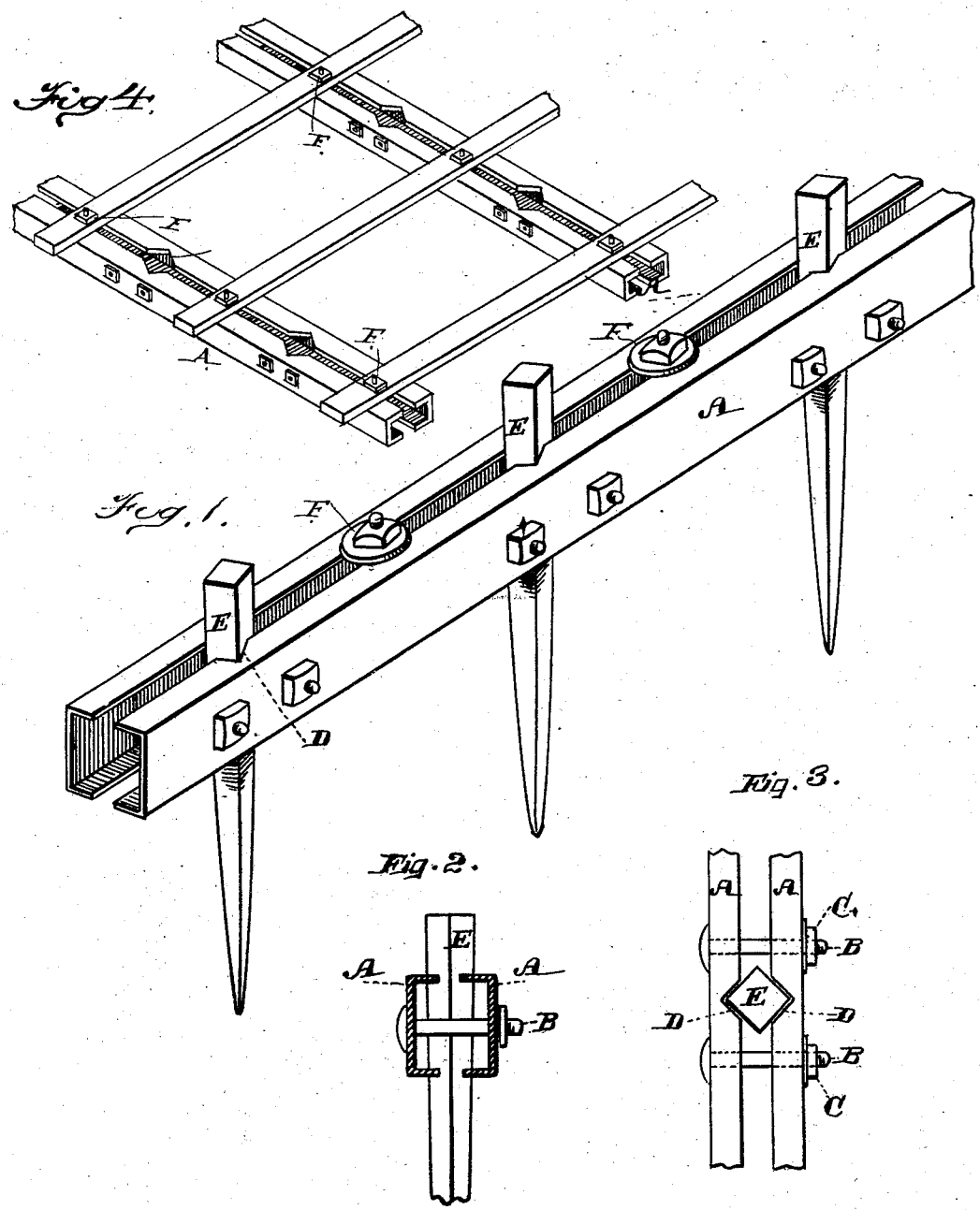

DON CARLOS MATTESON, OF STOCKTON, CALIFORNIA.

HARROW.

SPECIFICATION forming part of Letters Patent No. 264,546, dated September 19, 1882.

Application filed May 22, 1882. (No model.)

*To all whom it may concern:*

Be it known that I, DON C. MATTESON, of Stockton, county of San Joaquin, State of California, have invented an Improved Harrow; and I hereby declare the following to be a full, clear, and exact description thereof.

My invention relates to certain improvements in harrows; and it consists in an improved formation of the beams or bars of the harrows and in the manner of fixing and holding the teeth in place, as will be more fully explained by reference to the accompanying drawings, in which—

Figure 1 is a perspective view of a portion of a harrow, showing my construction. Fig. 2 is a transverse section. Fig. 3 is a top view. Fig. 4 illustrates the harrow-teeth bars and cross-braces.

In my harrow I form the beams in which the teeth are to be fixed of two pieces of iron, A, bent into a form ⊏, as shown. These angle-irons are placed with their open sides toward each other, and bolts B pass through them, so that nuts C at one end of the bolts may be turned up and clamp them together. These angle-bars have the upper and lower edges, which face each other notched, as shown at D, so that the opposite corners of the teeth E will rest in the upper and lower notches, and will thus be held firmly in place when the nuts C are drawn tight. The bolts B may pass through the angle-iron bars upon one or both sides of the teeth and closely enough to them to fix them firmly whenever the nuts are drawn up. When the teeth are fixed in place there will be a long, narrow slot between the two angle bars, and bolts F pass up through this slot and through the transverse beams, which form the harrow, thus holding them firmly together. These bolts F may be moved along the slots and thus adjusted to any desired point where the cross-timbers are to be fitted.

The angular notches D are made comparatively shallow; but it will be seen that angular teeth of any size may be inserted and held with equal firmness by simply separating the bars A or drawing them toward each other to suit the size of the teeth to be used; and this is one great advantage of my harrow, since the bars may be got out and notched for a great number of harrows without regard to the size of the teeth to be used, as any size will fit equally well.

Whenever a tooth is to be removed it may be done by simply loosening the nuts on the bolts B, when it will slip out easily.

Having thus described my invention, what I claim as new, and desire to secure by Letters Patent, is—

In a harrow, the tooth-holding channel-iron bars A, having the triangular notches D, the teeth E, and holding-bolts B, the bars A being separated so as to have vertical slots or channels between them, in combination with the bolts F, passing through and adjustable in said slots, and the transverse frame-timbers, substantially as and for the purpose herein described.

In witness whereof I hereunto set my hand.

DON CARLOS MATTESON.

Witnesses:
T. C. MALLON,
J. GAMBETTA.